No. 827,857. PATENTED AUG. 7, 1906.
R. F. FLEAK.
AUTOMATIC CHECK ROW CORN PLANTER AND MARKER.
APPLICATION FILED MAY 3, 1906.
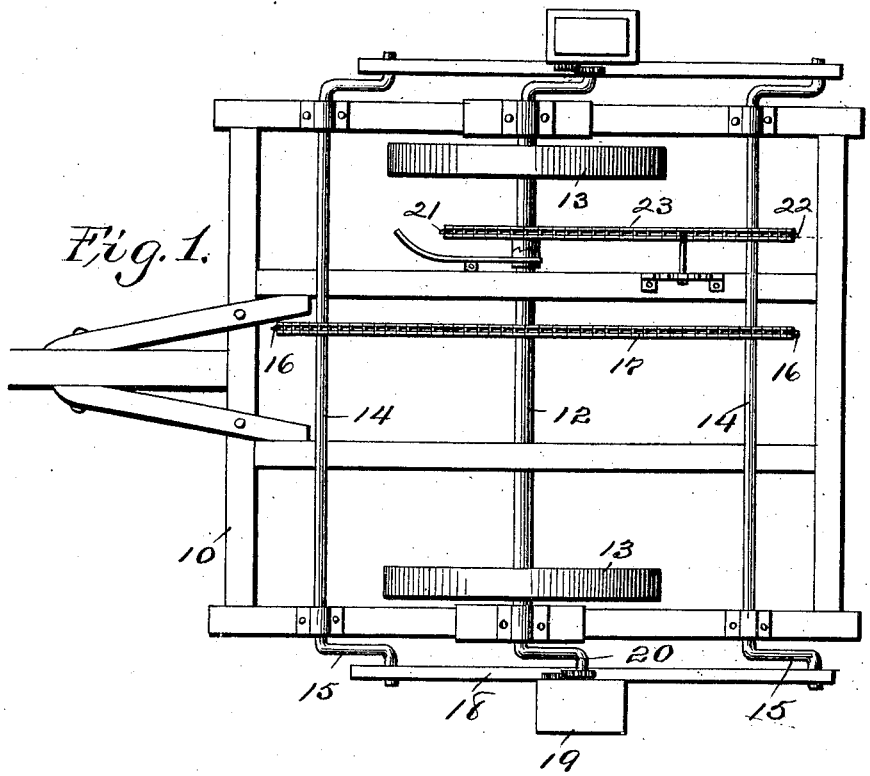
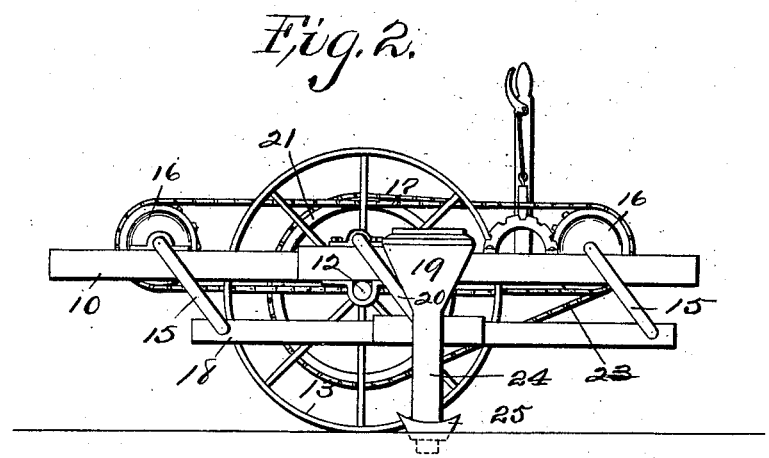

UNITED STATES PATENT OFFICE.

ROBERT F. FLEAK, OF TERLTON, OKLAHOMA TERRITORY.

AUTOMATIC CHECK-ROW CORN PLANTER AND MARKER.

No. 827,857.   Specification of Letters Patent.   Patented Aug. 7, 1906

Application filed May 3, 1906. Serial No. 315,063.

*To all whom it may concern:*

Be it known that I, ROBERT F. FLEAK, a citizen of the United States, residing at Terlton, in the county of Pawnee and Territory of Oklahoma, have invented a new and useful Automatic Check-Row Corn Planter and Marker, of which the following is a specification.

My object is, first, to provide a new and useful automatic check-row corn planter and marker; second, to dispense with the runner-frame and shoes or runners and furrow-openers fixed thereto; third, to dispense with fixed seedboxes and the machinery required for dropping seed therefrom at regular intervals of time and space as the planter is advanced in a field; fourth, to lessen the cost of construction and improve the efficiency of a check-row planter; fifth, to mark the ground as required, to be guided by the marks in making return trips and planting parallel rows equidistances apart; sixth, to provide means for manually adjusting the seed carriers and droppers relative to the marks in the ground as required to produce straight cross-rows while the planter is advancing across a field; seventh, to carry the seed-carriers and markers inoperative in turning about at the end of a field or in moving from one field to another.

My invention consists in the construction, arrangement, and combination of elements and subcombinations, as hereinafter set forth, pointed out in my claims, and illustrated in the accompanying drawings, in which—

Figure 1 is a top view that shows the positions of all the operative parts relative to each other and the carriage-frame with which they are connected. Fig. 2 is a side view of the planter. Dotted lines indicate the movements of the markers.

The numeral 10 designates an oblong carriage-frame, 12 an axle, and 13 wheels fixed to the axle inside of the frame.

A rotatable shaft 14 is mounted on top of the front portion of the frame and a corresponding shaft 14 on the rear portion of the frame, and both shafts have cranks 15 at their ends of uniform size and sprocket-wheels 16 at their central portions connected by a sprocket-chain 17. The ends of the cranks 15 are connected by straight bars 18. Seedboxes 19 are fixed to the side bars 18 and connected with the sides of the frame 10 by means of cranks 20 on the ends of the shaft 12, corresponding in size with the cranks 15, in such a manner that the seed-carriers will be lifted and thrust downward at each revolution of the shafts 14, and the cranks 20 will at the same time actuate valves in the seed-boxes.

To rotate the shafts 14, a sprocket-wheel 21 is fixed on the axle 12 and a sprocket-wheel 22 on the rear shaft 14 and a chain 22 placed on the said wheels. The difference in the diameters of the carriage-wheels 13 governs the time relative to each revolution of the axle and in the advance of the carriage that the seedboxes 19 are reciprocated and the space between the seeds dropped and the ground marked to indicate the places where they are dropped.

Seed-conveyers 24 extend down from the seed-carriers 19, and markers 25 are fixed to the lower ends of the conveyers.

In the practical operation of my invention it is obvious that at each revolution of the shaft 12 the crank 15 of the shafts 14 will actuate the bars 18, as required to simultaneously raise and lower the seedboxes 19, conveyers 24, and markers 25, and the cranks 20 on the ends of the shaft 12 will actuate a seed-dropping mechanism connected with the seedboxes, conveyers, and markers, as required to deposit seeds in the ground at regular intervals of time and space when the machine is advanced across the field to plant check-rows.

Having thus set forth the purpose of my invention and the construction and function of each element and subcombination and the arrangement and combination of all the operative parts, the practical operation and utility thereof will be obvious to persons familiar with the art to which it pertains.

What I claim as new, and desire to secure by Letters Patent, is—

1. In a check-row corn-planter, an oblong carriage-frame, an axle in bearings at the central portions of the parallel sides of the frame and a pole connected with the front and center of the frame, a rotatable shaft mounted at the rear portion of the frame and a sprocket-wheel fixed thereto, a sprocket-wheel fixed to the carriage-axle and a chain on the sprocket-wheels, a rotatable shaft mounted on the front portion of the carriage-frame, a sprocket-wheel fixed thereto, a corresponding wheel on the rotatable shaft on the rear portion of the carriage-frame and a chain on the two corresponding wheels, 2. In a check-row corn-planter, an oblong carriage-frame, an axle in bearings at the central portions of the parallel sides of the frame and a pole connected with the front and center of the frame, a rotatable shaft mounted at the rear portion of the frame and a sprocket-wheel fixed thereto, a sprocket-wheel fixed to the carriage-axle and a chain on the sprocket-wheels, a rotatable shaft mounted on the front portion of the carriage-frame, a sprocket-wheel fixed thereto a corresponding wheel on the rotatable shaft on the rear portion of the carriage-frame and a chain on the two corresponding wheels, cranks on the ends of the two rotatable shafts and straight bars pivotally connected with said cranks.

3. In a check-row corn-planter, an oblong carriage-frame, an axle in bearings at the central portions of the parallel sides of the frame and a pole connected with the front and center of the frame, a rotatable shaft mounted at the rear portion of the frame and a sprocket-wheel fixed thereto, a sprocket-wheel fixed to the carriage-axle and a chain on the sprocket-wheels, a rotatable shaft mounted on the front portion of the carriage-frame, a sprocket-wheel fixed thereto, a corresponding wheel on the rotatable shaft on the rear portion of the carriage-frame and a chain on the two corresponding wheels, cranks on the ends of the two rotatable shafts and straight bars pivotally connected with said cranks, seedboxes, seed-conveyers and markers connected with the central portion of said bars and means for dropping seeds from the boxes at regular intervals of time and space as the carriage is advanced.

4. In a check-row corn-planter, an oblong carriage-frame, an axle in bearings at the central portions of the parallel sides of the frame and a pole connected with the front and center of the frame, a rotatable shaft mounted at the rear portion of the frame and a sprocket-wheel fixed thereto, a sprocket-wheel fixed to the carriage-axle and a chain on the sprocket-wheels, a rotatable shaft mounted on the front portion of the carriage-frame, a sprocket-wheel fixed thereto, a corresponding wheel on the rotatable shaft on the rear portion of the carriage-frame and a chain on the two corresponding wheels, cranks on the ends of the two rotatable shafts and straight bars pivotally connected with said cranks, seedboxes, seed-conveyers and markers connected with the central portions of said bars, cranks on the ends of the axle and rotatable disks in the seedboxes for dropping seeds from the boxes at regular intervals of time and space as the carriage is advanced.

ROBERT F. FLEAK.

Witnesses:
R. R. Dunn,
R. A. Mahaney.